United States Patent Office 2,790,320
Patented Apr. 30, 1957

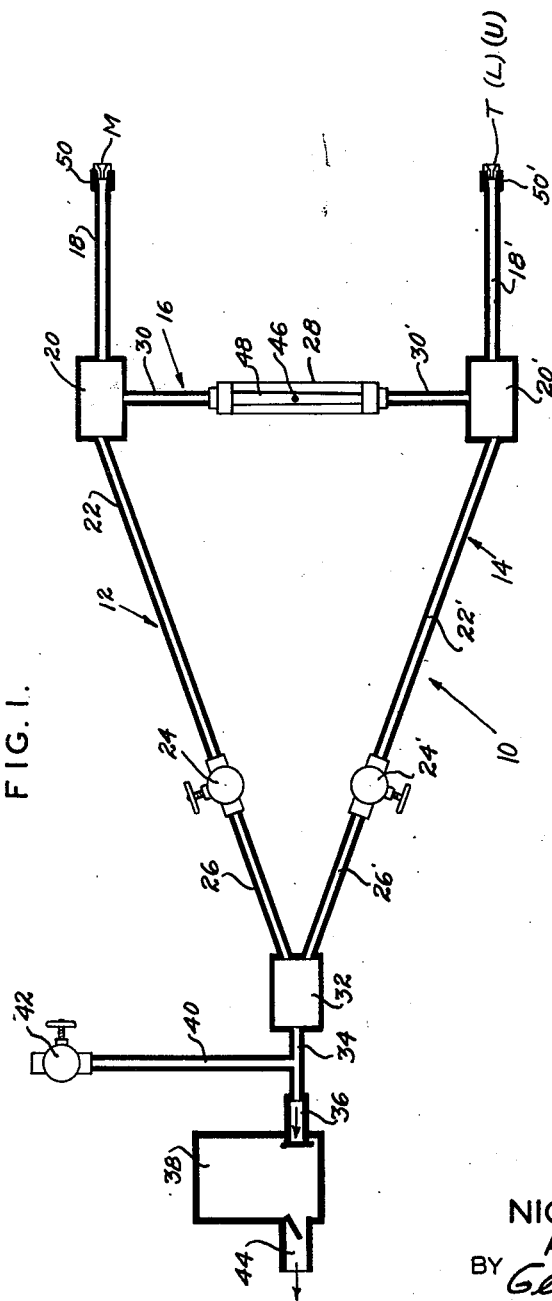

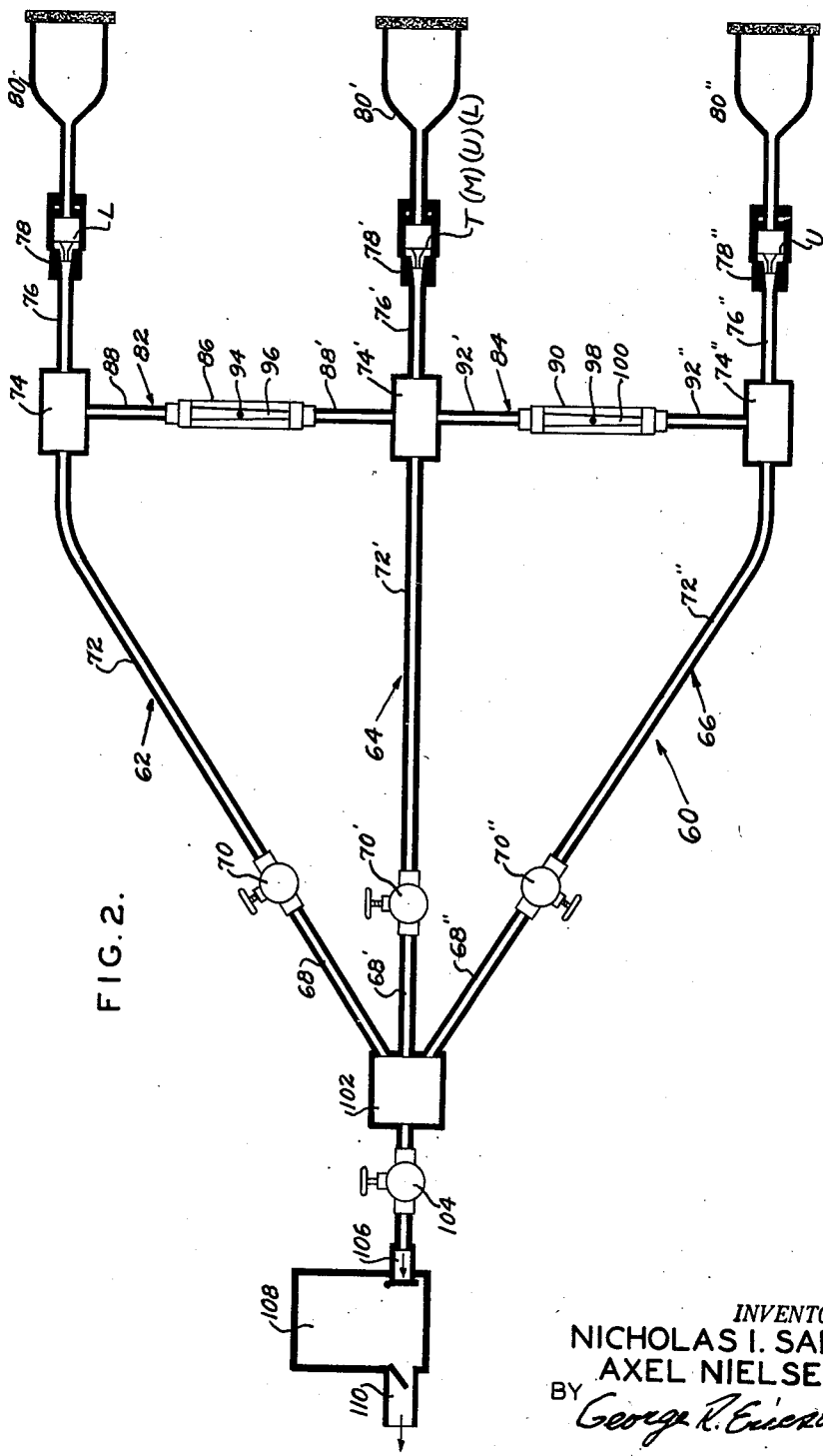

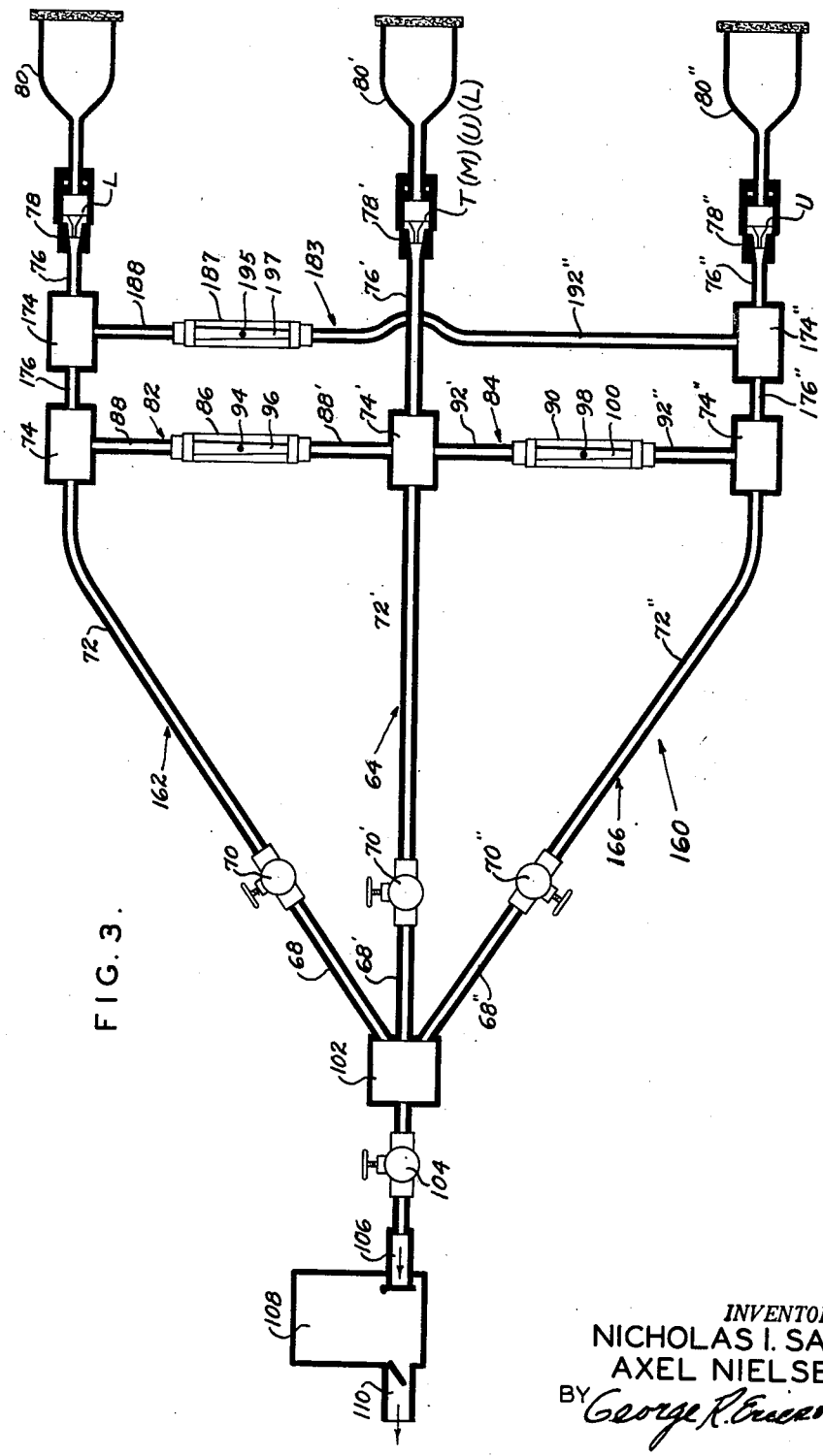

2,790,320

PNEUMATIC FLOW-MEASURING DEVICE FOR FUEL JETS

Nicholas I. Salko and Axel Nielsen, St. Louis, Mo., assignors, by mesne assignments, to ACF Industries, Incorporated, New York, N. Y., a corporation of New Jersey Application January 11, 1954, Serial No. 403,273

7 Claims. (Cl. 73—3)

The present invention relates to testing equipment, and more particularly to a novel pneumatic flow measuring device for ascertaining fluid flow characteristics of mass produced jets or nozzles in comparison with like characteristics of two similarly shaped master jets especially adapted to provide upper and lower limits, respectively, of a tolerated range of fluid flow characteristics.

A primary object of the invention is to provide a device for quickly determining whether or not individual mass produced automotive carburetor fuel jets provide a rate of fluid flow which is within specific arbitrarily defined limits.

Another object of the invention is to provide a novel method for comparing the rate of fluid flow through an individual mass produced jet with the rate of flow through each of two similarly shaped master jets especially adapted to provide rates of fluid flow which define, respectively, the upper and lower limits of a tolerated range of rates.

With these objects in view, the invention contemplates a device for passing a fluid, such as air, simultaneously through the jet to be tested and through one or more master jets having predetermined fluid flow characteristics. The device includes a piping arrangement for disposing the several jets for parallel flow, and one or more differential type flow gauges are provided for comparing the rates of parallel flow through the several jets. In addition, means are provided for calibration and adjustment of the apparatus.

The exact nature of the invention will be readily apprehended from the following description, taken in conjunction with the accompanying drawings, in which:

Figs. 1, 2 and 3 are schematic representations of different and distinct pneumatic flow measuring devices, each embodying the teachings of the present invention.

Referring to the drawings more particularly by means of reference numerals and considering first the arrangement of Fig. 1, a pneumatic flow measuring device 10 comprises a symmetrical dual flow piping arrangement in which a master leg 12 and a test leg 14 are interconnected through a comparator leg 16. The master leg 12 includes an entrance pipe 18, a junction box 20, a flow pipe 22, a control valve 24, and a connector pipe 26 connected in consecutive order as clearly depicted in Fig. 1; and it will be noted that the test leg 14 includes an identical arrangement, the elements being designated with primed numerals in correspondence with the elements of the master leg 12.

The comparator leg 16 includes a flow sensitive meter 28, opposite ends of which are connected into the junction boxes 20 and 20' by means of connecting pipes 30 and 30' respectively.

As is apparent from Fig. 1, the connector pipes 26 and 26' of the flow legs 12 and 14 are connected into a common junction box 32, the latter being also connected through a pipe 34 into an inlet 36 of a diagrammatically illustrated suction pump 38. A bleeder pipe 40 provided with a bleeder valve 42 is connected into the pipe 34 between the junction box 32 and the pump 38. The pump 38 has an exhaust check valve 44.

It is desirable that the various elements of the device 10 be proportioned to provide a low degree of turbulence in the fluid flow therethrough. To this end, the pipe sizes, while not critical, are selected to insure relatively low velocities of flow, and the junction boxes are of comparatively large size, as illustrated, to eliminate undue turbulence at points of intersecting flow. In giving a general idea of suitable pipe sizes for a device 10 adapted to test fuel jets for automotive carburetors, it may be mentioned that entrance pipes 18 and 18' of $3/16''$ diameter, flow pipes 22 and 22' of $1/4''$ diameter, and connecting pipes 30 and 30' of $1/8''$ diameter have proven quite satisfactory. In certain instances, as in devices requiring larger pipe sizes to accommodate a desired fluid flow, fluid straighteners in the form of tube bundles may be incorporated in the various pipes. The pipes most likely to require such straighteners will be the entrance pipes 18 and 18' and the connecting pipe 30' connected into the lower end of the flow sensitive meter 28.

The control valves 24 and 24', as well as the bleeder valve 42, are preferably of the type having a grooved tapered stem to provide accurate adjustable control of the fluid flow, as will be described hereinafter. Needle valves may be used, but are more susceptible to the becoming clogged from impurities in the fluid stream.

The flow sensitive meter 28 is preferably one in which a light spherical ball 46, made of aluminum, for example, is disposed for free movement in a tapered tube 48. The tube 48, constructed of a transparent material such as glass, is disposed in a vertical position and is tapered throughout its length, being narrower at the bottom and wider at the top. With this arrangement, an upward flow of fluid past the ball 46 will cause it to assume a vertical elevation which corresponds with the amount of fluid flowing therepast.

Each of the entrance pipes 18 and 18' is provided at its free end with an appropriate clamp or holder 50 or 50' adapted to receive a metering jet which controls the rate at which fluid may enter the particular entrance pipe under the influence of the vacuum produced by operation of pump 38. Thus, a jet M is disposed in the holder 50 at the entrance of the master leg 12, and a jet T is disposed in the holder 50' at the entrance of the test leg 14. The jet M is a master jet formed by suitably accurate methods to a precise size which is suited, as will be described, for testing a particular group of mass produced jets. The jet T, on the other hand, is one of the mass produced jets to be tested to ascertain whether or not its size is within a predetermined tolerance.

In calibrating the device 10 prior to testing mass produced jets, an appropriate master jet M is disposed as aforesaid in the holder 50. This master jet M may well be of the precise size which has been determined to be ideal for the mass produced jets to be tested. Instead of a mass produced jet T, however, a calibrating jet L, formed by precise methods to the lower limit of tolerance determined for the mass produced jets, is at this time disposed in the holder 50'. The device 10 is then subjected to evacuation by means of the aforementioned vacuum source.

It is evident now, assuming one or both of the control valves 24 and 24' to be at least partially opened, that air will be induced to enter the device 10 through both the master jet M and the lower limit calibrating jet L disposed at this time in the holder 50'. If only one of the valves 24 and 24' is at least partially opened, all of the air which enters the opposite one of the legs 12 and 14 will traverse the comparator leg 16. Now, if the remaining valve 24 or 24' is opened slightly, it is obvious that the rate of flow through the comparator leg 16 will be diminished due to the fact that at least a portion of the air flow which previously had to traverse the comparator leg 16 is now diverted through a more direct path to the junction box 32. Further opening of the said remaining valve 24 or 24' will effect a further reduction in the rate of flow through the comparator leg 16, and it is evident that under certain circumstances the flow which initially obtained in the comparator leg 16 may be progressively reduced to zero, and even reversed.

Inasmuch as the ball 46 has a certain mass, it is apparent that it can respond only to a flow which is upwardly through the meter 28. For this reason, then, the control valves 24 and 24' are adjusted, along with the bleeder valve 42, so as to position the ball 46 at a point which is preferably intermediate the bottom and the middle of the tube 48. This adjusted position of the ball 46 is then marked on the outside of the tube 48.

With the tube 48 marked as above described, the lower limit calibrating jet L is replaced by a second calibrating jet U formed by precise methods to the upper limit of tolerance determined for the mass produced jets. Clearly, the larger size of this upper limit calibrating jet U, as compared to the lower limit calibrating jet L, will admit an increased flow of air into the test leg 14 which is connected into the lower end of the meter 28. This results in an increased flow upwardly through the tube 48 so that, without changing the adjustment of the valves 24, 24' and 42, the ball 46 assumes a more elevated position than that previously noted. This second position of the ball 46 is then marked on the outside of the tube 48.

The device 10 is now ready for testing mass produced jets. Without disturbing the master jet M or any of the valve adjustments, the upper limit calibrating jet U is removed and mass produced jets T are inserted one after another in the holder 50'. Clearly, the spaced markings on the tube 48 are indicative of the limits within which the ball 46 must be positioned for any mass produced jet T to be considered as acceptable.

In manipulating the valves 24, 24' and 42 to establish the above-mentioned markings on the tube 48, one method which has been found to be both rapid and accurate is as follows:

With the master jet M and the lower limit calibrating jet L in place, and with the vacuum turned on, the valve 24 in the master leg 12 is placed in full open position and the valve 24' in the test leg 14 is closed. Now, if the bleeder valve 42 should be completely closed, the full available vacuum would be pulled on the master leg 12 alone, and the ball 46 would rise to the top of the tube 48. The valve 42 is therefore opened to the extent necessary to dissipate the vacuum to a point such that the ball 46 will drop just slightly away from the top of the tube 48. Following this, the control valve 24' is opened to the extent necessary to cause the ball 46 to drop to a position which is preferably in the lower half of the tube 48. A tentative mark is made on the tube opposite this low position of the ball 46, after which the lower limit calibrating jet L is replaced with the upper limit calibrating jet U. If the resulting new position of the ball 46 is still below the extreme top of the tube 48, the new position may be firmly marked, and the lower limit mark originally regarded as tentative may be emphasized. The calibration is now completed and the device 10 is ready to serve its intended function.

If, during the above calibrating process, it is found that insertion of the upper limit calibrating jet U causes the ball 46 to go to the extreme top of the tube 48, the control valve 24 is progressively closed until the ball drops appreciably. This new upper position of the ball 46 is then marked tentatively and the lower limit mark originally made is erased. The upper limit calibrating jet U is then replaced with the lower limit calibrating jet L, and if the resulting new lower position of the ball 46 is still above the extreme bottom of the tube 48, the new position may be firmly marked and the upper limit mark originally regarded as tentative may be emphasized, thereby completing the calibration.

If, on the other hand, this replacement of the lower limit calibrating jet L causes the ball 46 to go to the extreme bottom of the tube 48, the control valve 24' is progressively closed until the ball rises appreciably, whereupon another tentative lower limit mark is made and the previously made tentative upper limit mark is erased. This procedure of adjusting the tentative upper and lower limit marks is repeated until emplacement of either of the calibrating jets L and U in the holder 50' will result in the ball 46 being suspended intermediate the upper and lower ends of the tube 48 without further adjustment of either of the valves 24 and 24'.

If, perchance, it be found impossible to achieve a proper calibration by the above method, the reason will be that the particular master jet M employed is too small for the size and tolerance of the jets to be tested. It is obviously necessary, therefore, to replace the original master jet M with one of larger size and to repeat the calibration process. Where, on the other hand, it is found that, notwithstanding the achievement of a proper calibration, the upper and lower limit marks are relatively closely spaced, a greater separation of the marks may be obtained by employing a master jet M of slightly smaller size. Preferably, the separation of the upper end lower limit marks should equal from about one-third to one-half the length of the tube 48.

If, upon attainment of a proper calibration, it be found that one of the marks is closer to its end of the tube 48 than the other, the position of the ball 46 in respect to both marks may be either raised or lowered by progressively closing or opening the bleeder valve 42. If such an adjustment be made, the calibration should be checked for final accuracy.

Referring now to Figure 2 of the drawings, a more sensitive pneumatic flow measuring device 60 comprises a triple flow piping arrangement which includes a lower limit leg 62, a test leg 64, and an upper limit leg 66. The lower limit leg 62 includes a connector pipe 68, a control valve 70, a flow pipe 72, a junction box 74, and an entrance pipe 76, all in consecutive connection as illustrated. The free end of the entrance pipe 76 is provided with a suitable clamp or holder 78 adapted to receive a lower limit jet L. For maximum accuracy in the device 60, an appropriate filter assembly 80 is provided as shown to deliver filtered air or other fluid to the lower limit leg 62. As is clear from the drawings, the test leg 64 and the upper limit leg 66 are substantially identical with the lower limit leg 62, and corresponding elements have therefore been designated by like numerals distinguished by means of a prime for the test leg 64 and by means of a double prime for the upper limit leg 66. It will be noted, however, that the upper limit leg holder 78'' receives an upper limit jet U, while the test leg holder 78' may receive, not only individual mass produced jets T to be tested, but alternatively, for purposes of calibration, a master jet M, another upper limit jet U, and another lower limit jet L. It is, of course, apparent that only one jet at a time is disposd in the holder 78'.

In addition to the three flow legs 62, 64 and 66, the device 60 includes a lower limit comparator leg 82 and an upper limit comparator leg 84. The lower limit comparator leg 82 comprises a flow sensitive meter 86 having its opposite ends connected into the junction boxes 74 and 74' by means of connecting pipes 88 and 88', respectively; and the upper limit comparator leg 84 comprises a flow sensitive meter 90 having its opposite ends connected into the junction boxes 74' and 74'' by means of connecting pipes 92' and 92'', respectively.

The meters 86 and 90 are preferably identical and of the same type as the meter 28, previously described. Thus, the meter 86 includes a ball 94 which is freely movable in a vertical tapered tube 96, and the meter 90 includes a ball 98 which is freely movable in a vertical tapered tube 100. Although the schematic representation of Fig. 2 shows otherwise, it will be understood that, in practice, the meters 86 and 90 are preferably mounted side by side.

As in the device 10, the several flow legs of the device 60 are connected into a common junction box, designated 102 in Figure 2. This junction box 102 is then connected through a main control valve 104 into an inlet 106 of pump 108. The pump 108 has an outlet check valve 110.

The sizes of the various elements of the device 60 and the desirability of using flow straighteners are preferably decided on the same basis as described for the device 10. For testing automotive carburetor fuel jets, the pipe sizes previously enumerated have been found to give satisfactory results in corresponding positions in the device 60.

It will be understood that the upper limit jet U disposed in the holder 78" and the lower limit jet L disposed in the holder 78 are formed to the precise upper and lower limits, respectively, for the mass produced jets to be tested. These jets U and L remain in their respective holders both during calibration and during subsequent operation of the device 60. In calibrating the device 60 prior to testing mass produced jets, however, an additional one of each of the jets U and L is provided for temporary insertion in the test leg holder 78', as will be described. The master jet M, used only during calibration of the device 60, is formed by precise means to a size which is preferably midway between that of the jets U and L.

With a jet L in the holder 78 and a jet U in the holder 78" then, the calibration process is initiated by inserting the master jet M in the holder 78' and subjecting the device 60 to evacuation by means of the aforementioned vacuum source. The behavior of the balls 94 and 98 in their respective tubes 96 and 100 will, of course, be in accordance with the principles previously set forth in respect to the ball 46 in the device 10, from which it will be understood that appropriate manipulation of the valves 70, 70', 70" and 104 will cause the balls 94 and 98 to assume equal elevations which are preferably at the centers of the tubes 96 and 100.

With this accomplished, the master jet M is replaced with an upper limit jet U, whereupon the ball 94 will rise and the ball 98 will fall. These new positions of the balls 94 and 98 are marked on the outside of their respective tubes 96 and 100. The jet U in the holder 78' is then replaced with a lower limit jet L, whereupon the ball 94 will fall and the ball 98 will rise, each passing the center of its respective tube 96 or 100. These positions of the balls 94 and 98 are also marked on the outside of their respective tubes 96 and 100.

The device 60 is now ready for testing mass produced jets. Without disturbing either of the jets disposed in the holders 78 and 78", or any of the valve adjustments, the mass produced jets T are inserted one after another in the holder 78'. Clearly, the spaced markings on the tubes 96 and 100 are indicative of the limits within which the balls 94 and 98 must be positioned for any mass produced jet T to be considered as acceptable.

The foregoing description assumes, of course, that the balls 94 and 98 remain at all times clear of the top and bottom of their respective tubes 96 and 100. Where even greater sensitivity is desired, however, the several control valves may be adjusted so that with the upper limit jet U in the holder 78' the ball 94 will be just slightly below the top of its tube 96 while the ball 98 rests at the bottom of its tube 100, and so that with the lower limit jet L inserted in the holder 78', the ball 98 will be just slightly below the top of its tube 100 while the ball 94 rests at the bottom of its tube 96. Calibrated in this manner, the device 60 provides for increased movement of the balls 94 and 98 between the limits of tolerance in the mass produced jets to be tested.

In manipulating the valves 70, 70', 70" and 104 for the first-mentioned calibration of the device 60, one method which has been found to be both rapid and accurate is as follows:

With the master jet M in the holder 78' and with the vacuum turned on, the valve 70 in the lower limit leg 62 is placed in full open position and the valves 70' and 70", in the test leg 64 and the upper limit leg 66, respectively, are closed. Now, if the main control valve 104 should be opened wide, the full available vacuum would be pulled on the lower limit leg 62 alone and the consequent upward flow of air through the comparator legs 82 and 84 would cause both the ball 94 and the ball 98 to rise to the tops of their respective tubes 96 and 100. The valve 104 is, therefore, adjusted so that the vacuum extended to the interconnected flow legs is just sufficient to maintain the ball 98 near, but definitely below, the top of its tube 100. Under this condition, the ball 94 will remain at the top of its tube 96 because of the greater flow within the lower limit comparator leg 82, handling as it does both the air which enters the master jet M and that which flows through the upper limit comparator leg 84 from the upper limit jet U.

The next adjustment is progressively to open the valve 70" in the upper limit leg 66 until the ball 94 drops slightly, but definitely, away from the top of its tube 96. This opening of the valve 70" will, of course, cause the ball 98 to descend further in its tube 100. If the ball 98 reaches the bottom of its tube 100 before the ball 94 is freed from the top of its tube 96, the valve 70" is left in its adjusted position and the valve 70 is progressively closed until the ball 94 becomes free near the top of its tube 96. If now the ball 98 is once more at bottom, the valve 70" is closed until the ball 98 is free near the bottom of its tube 100. This alternate closing of the valves 70 and 70" to lower the ball 94 and to raise the ball 98, respectively, is continued until both balls are free, with the ball 94 near the top of its tube 96 and with the ball 98 near the bottom of its tube 100.

With the valves 70 and 70" thus adjusted, the valve 70' is progressively opened, whereupon the balls 94 and 98 will move toward each other. This adjustment of the valve 70' is continued until the balls are at equal elevations.

The next step in the calibration process is to replace the master jet M with an upper limit jet U, which will cause the ball 94 to rise and the ball 98 to fall. If either ball reaches the end of its tube, the appropriate valve 70 or 70" is closed as above described until both balls are free, care being taken that adjustments of the valves 70 and 70" are made only in a closing direction.

At the completion of the immediately foregoing adjustment, the upper limit jet U in the holder 78' is replaced with a lower limit jet L, which will cause the ball 94 to fall and the ball 98 to rise. If either ball reaches the end of its tube, the appropriate valve 70 or 70" is further adjusted, again only in a closing direction, until both balls are free.

With the above adjustments completed, the master jet M is again inserted in the holder 78' and the balls 94 and 98 are once more brought to even elevation by appropriate opening or closing of the valve 70'. This will normally complete the calibration adjustments, and it remains only to reinsert the upper and lower limit jets U and L in the holder 78' and to mark the resulting excursions of the balls 94 and 98. If, perchance, either ball reaches the end of its tube in these check tests, adjustments are made in a manner which will now be understood, and the calibration resumed until completed as above indicated.

If the more sensitive calibration of the device 60 is desired, the same may be achieved in various ways which will now be apparent to those skilled in the pertinent art. For example, the above procedure may be followed through the step of first inserting the upper limit jet U in the holder 78'. If the ball 94 is at this time well below the top of its tube 96, the main control valve 104 is opened until the ball 94 is near, but definitely below, the top of its tube 96. If, on the other hand, this ball is at the top of its tube, the valve 70" is closed until the ball 94 is free near the top of its tube.

With the proper adjustment of the valves 104 and 70" made, the upper limit jet U is replaced in the holder 78' with a lower limit jet L and the position of the ball 98 is noted. If this ball is now well below the top of its tube 100, the valve 70 is opened until the ball 98 is near, but definitely below, the top of its tube 100. If, on the other hand, this ball is at the top of its tube, the valve 70" is closed until the ball 98 is free near the top of its tube. The upper limit jet U is now again inserted in the holder 78' and adjustments are made as before to position the ball 94 near the top of its tube 96. This procedure is continued until interchange of the upper and lower limit jets U and L in the holder 78' does not indicate a need for further adjustment of the valves. the master jet M may then be inserted in the holder 78' and the balls 94 and 98 brought to equal elevations by adjustment of the valve 70', after which a final check should be made as in the previously described calibration of the device 60.

Figure 3 of the drawings illustrates a flow measuring device 160 in an arrangement which is quite obviously a modification of the previously described device 60. Hence, the same reference numerals and symbols have been employed to designate those elements of the device 160 which find corresponding identical elements in the device 60.

The device 160 differs from the device 60 in having a lower limit leg 162 and an upper limit leg 166 which include individual junction boxes 174 and 174", respectively connected by means of connections 176 and 176" to the junction boxes 74 and 74". The entrance pipes 76 and 76" are then connected, respectively, into these added junction boxes 174 and 174".

A master comparator leg 183 comprises a flow sensitive meter 187 having its opposite ends connected into the junction boxes 174 and 174" by means of connecting pipes 188 and 192", respectively. The meter 187 is of the same type as the meters 28, 86 and 90 previously discussed. Thus, the meter 187 includes a ball 195 which is freely movable in a vertical tapered tube 197. Preferably, in actual practice, the three meters 86, 90 and 187 of the device 160 are disposed side by side.

In calibrating the device 160, use is again made of the master jet M, as well as the extra upper and lower limit jets U and L. Following methods which are now familiar, the valves 70, 70', 70", and 104 are adjusted so that operation of the device 160 with the master jet M in the holder 78' causes the balls 94 and 98 to assume positions of equal elevation in the lower half of their respective tubes 96 and 100 while, at the same time, the ball 195 assumes a position in the upper half of its tube 197. This higher position of the ball 195 as compared to the balls 94 and 98, indicates the obvious fact that under the conditions stated there will be greater flow through the master comparator leg 183 than through either the lower limit comparator leg 82 or the upper limit comparator leg 84.

If now, the master jet M be replaced by an upper limit jet U, and the two jets U, one in the holder 78' and the other in the holder 78", are effective to balance each other off through the upper limit comparator leg 84, it is clear that equal flows entering the two jets U and passing through the respective meters 86 and 187 will cause the balls 94 and 195 to assume equal elevations in the upper halves of their respective tubes 96 and 197. By the same token, it may readily be understood that if the upper limit jet U in the holder 78' were to be replaced with any jet, such as one of the jets T, having an orifice which exceeded the maximum tolerance, the ball 94 would rise above the ball 195, and thereby indicate the defective condition of the jet under test.

It is, of course, evident from the immediately foregoing, as well as from heretofore noted similarities between the devices 60 and 160, that equal flows through the lower limit jet L in the holder 78 and an identical jet L in the holder 78', balanced off through the lower limit comparator leg 82, would cause the ball 98 to rise to the same elevation as the ball 195. Further, a jet that was smaller than minimum tolerance would, when inserted in the holder 78', cause the ball 98 to rise above the ball 195.

In testing mass produced jets T in the device 160, they are inserted one after another in the holder 178'. Clearly, the ball 195 in the master comparator leg 183 provides a master indication which, while subject to movement under changing dynamic conditions within the device 160, provides a basis for comparing the indications of the balls 94 and 98 in the respective upper and lower limit comparator legs 82 and 84. If either of the balls 94 and 98 should rise above the ball 195, the jet then being tested would be indicated to be outside of tolerance and hence unacceptable.

Clearly, there have been disclosed a plurality of novel structural arrangements, along with various methods for operating the same for pneumatic flow measuring testing of mass produced jets or nozzles in accordance with the objects set forth above.

It is to be understood that the foregoing description and the accompanying drawings have been given by way of illustration and example. It is also to be understood that changes in form of the elements, rearrangement of parts, and substitution of equivalent elements or method steps, which will be obvious to those skilled in the art, are contemplated as within the scope of the present invention which is limited only by the claims which follow.

What is claimed is:

1. An apparatus for comparing the flow capacity of a test orifice with a master orifice comprising a plurality of fluid passages connected into a common chamber, means for connecting said chamber to a vacuum source for the purpose of inducing a flow of fluid through said fluid passages, inlet means in each of said fluid passages having holders for receiving the master orifice and interchangeably comparative orifices for calibration of said apparatus or an orifice to be tested, flow conducting means connected across two of said fluid passages including a flow sensitive meter having indicator movable in the direction of flow therethrough, and means to calibrate said apparatus for testing, including flow control valves in each said fluid passage intermediate said chamber and fluid conducting means to adjust the upper and lower tolerance limits of indicator movement for comparative flows between the master orifice flow and a selected comparative orifice means producing other flows to establish readings on said indicator for an acceptable tolerance, and means controlling the pressure in said common chamber to raise or lower the range of movement of said indicator.

2. An apparatus for comparing the flow capacity of a test orifice with master orifices for upper and lower flow limits, said apparatus comprising a multiple flow piping arrangement including a plurality of flow legs disposed in parallel flow arrangement for discharge into a single junction box, means to cause a flow of fluid through said legs to said box, each of said flow legs having an inlet with a holder adapted to receive the orifices for upper and lower flow limits, respectively, and the orifices for calibration and testing, a fluid conducting comparator leg interconnecting each of said flow legs with another leg, a flow sensitive meter having a movable indicator in each said comparator leg, and means to calibrate said device including flow control valves in each said flow leg to adjust the upper and lower tolerance limits of indicator movement for each meter for comparative flows between a master orifice and the orifices for upper and lower flow limits to establish corresponding readings on said indicators of acceptable tolerances, and means for controlling the pressure in said junction box to raise or lower the range of movement of each said indicator.

3. An apparatus for comparing the flow capacity of a test orifice with master orifices for upper and lower flow limits, said apparatus comprising a triple flow piping arrangement including three fluid conducting flow legs each having a discharge end and an entrance end, holders at the entrance ends of their respective flow legs to receive the test and master orifices, means joining said legs for parallel fluid flow therethrough, means to induce a fluid flow through said legs, each of said legs being provided with a control valve, and separate fluid conducting means interconnecting one of the flow legs with each of the other two flow legs all at points intermediate their valves and their entrance ends, each of said separate interconnecting means including a rate of flow indicator responsive to changes in rate of flow therethrough.

4. The device of claim 3 wherein each of the said other two flow legs is provided with a fluid jet formed accurately to different predetermined dimensions and the said one of the flow legs is provided with means for replaceably receiving individual fluid jets to be tested.

5. The device of claim 4 wherein one of said accurately formed jets is of a size equal to the lower limit of tolerance for the jets to be tested and the other of said accurately formed jets is of a size equal to the upper limit of tolerance for the jets to be tested.

6. The device of claim 5 wherein each of the rate of flow indicators is responsive only to unidirectional flow, the effective direction of flow for one of the indicators being from the flow leg which contains the jet formed to said upper limit of tolerance toward the flow leg which receives a jet to be tested and the effective direction of flow for the other of the indicators being from the flow leg which receives a jet to be tested toward the flow leg which contains the jet formed to said lower limit of tolerance.

7. The device of claim 6 with an added fluid conducting means interconnecting the flow legs which contain the jets formed to said tolerance limits, said added fluid conducting means including a rate of flow indicator responsive to unidirectional changes in rate of flow therethrough.

References Cited in the file of this patent
UNITED STATES PATENTS

| | | |
|---|---|---|
| 2,293,725 | Flock et al. | Aug. 25, 1942 |
| 2,390,252 | Hayward | Dec. 4, 1945 |
| 2,414,582 | Crosby et al. | Jan. 21, 1947 |
| 2,593,957 | Aller | Apr. 22, 1952 |
| 2,597,231 | Edelen | May 20, 1952 |

FOREIGN PATENTS

| | | |
|---|---|---|
| 508,828 | Great Britain | July 6, 1939 |